Sept. 16, 1969   E. L. REGALIA   3,467,408
HEAVY DUTY TRUCK TRAILER
Filed April 20, 1967   2 Sheets-Sheet 1
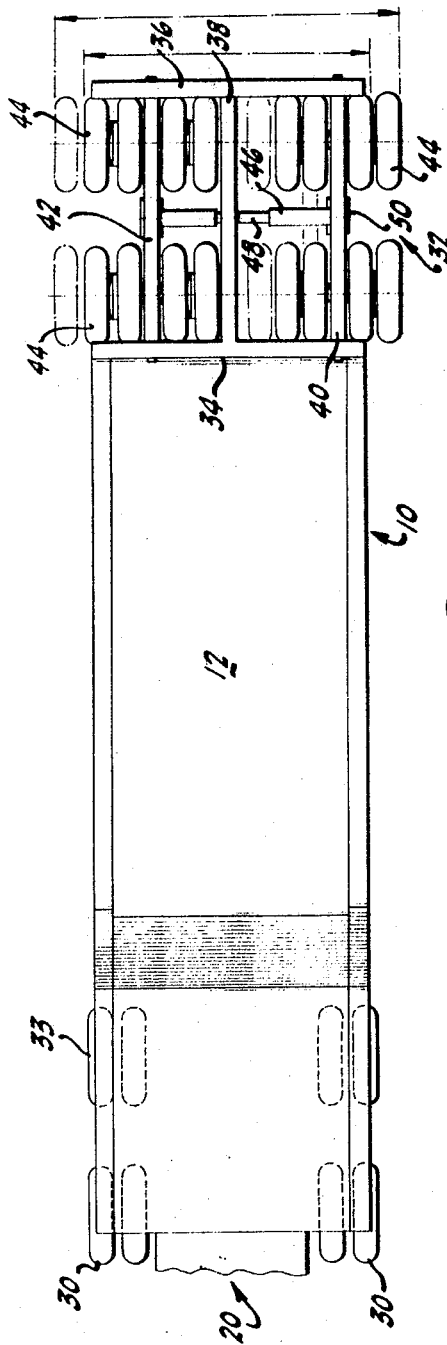
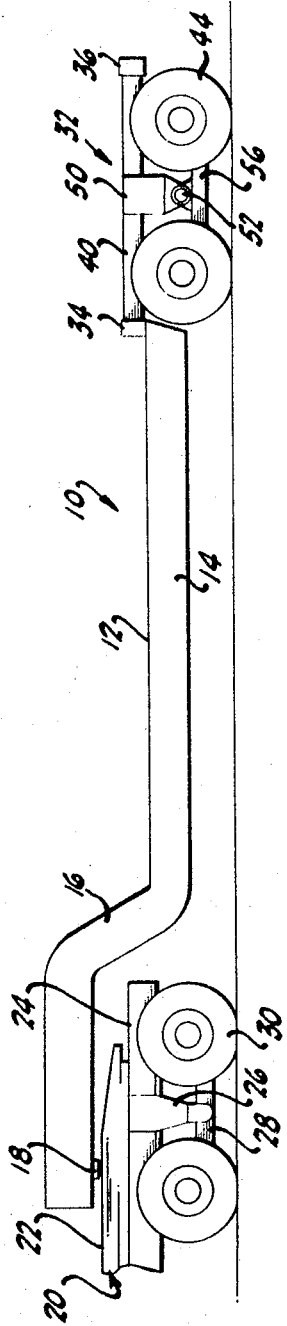
INVENTOR
EMIL L. REGALIA
BY Gregg & Stidham
ATTORNEYS

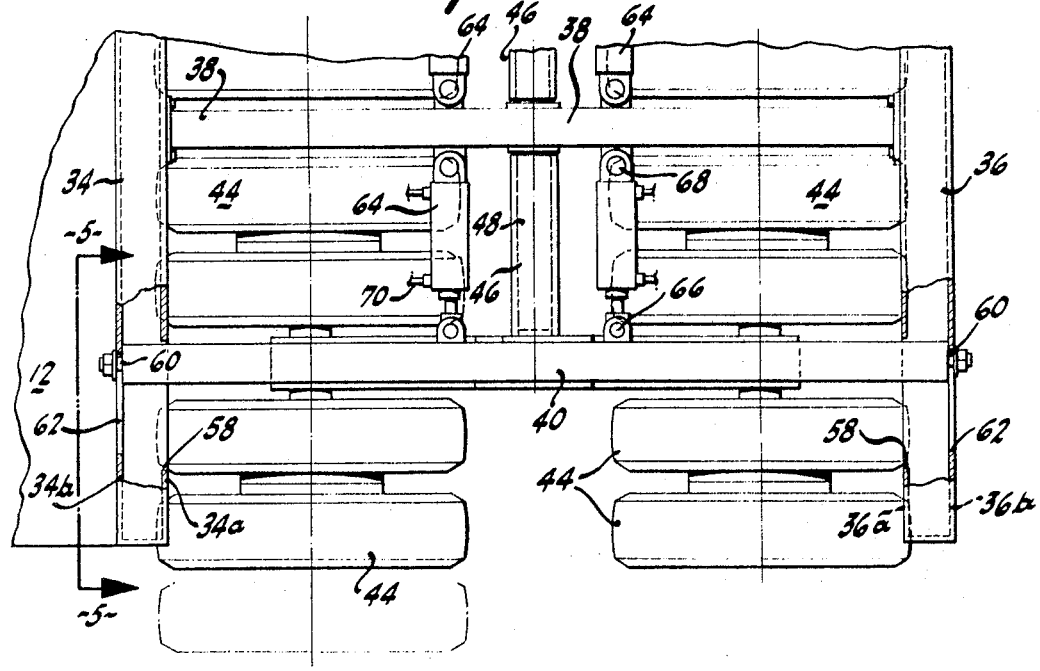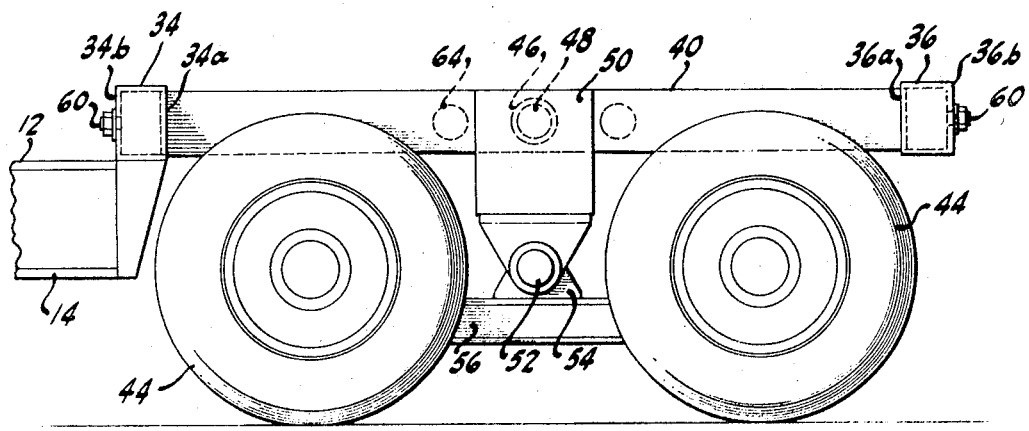

United States Patent Office 3,467,408
Patented Sept. 16, 1969

3,467,408
HEAVY DUTY TRUCK TRAILER
Emil Louis Regalia, 128 Foothill Blvd.,
Napa, Calif. 94558
Filed Apr. 20, 1967, Ser. No. 632,246
Int. Cl. B62d 21/14, 53/06
U.S. Cl. 280—34                                   6 Claims

ABSTRACT OF THE DISCLOSURE

A heavy duty truck trailer particularly adapted for hauling earth moving equipment and other extremely heavy loads and including a mechanism for extending between the outsides of the tires so as to qualify the trailer to carry heavier loads, and for retracting the wheels when the trailer is empty or under light loads so as to qualify the trailer for extended travel hours.

Description

This invention relates to a heavy duty truck trailer, and, more particularly, to a truck trailer that meets regulations for carrying extremely heavy loads, but with minimum restrictions against road use which are ordinarily imposed against trailers of that size.

Travel over most of the nation's highways is governed by strict regulations which are increasingly rigid as they apply to vehicles adapted for transportation of heavy loads. For example, in California a truck trailer having wheel units which measure up to eight feet across the full tire width, i.e., between the outsides of the outer tires, is qualified to carry loads up to 53,000 lbs. A trailer having an overall tire width of ten feet is qualified to carry up to 58,000 lbs. by reason of the fact that the increased width provides for greater stability of the vehicle. Hence, from the standpoint of load carrying capacity, it is desirable to have a trailer built of such width that the overall tire dimension is as large as possible within reasonable limits. However, when the overall tire width dimension exceeds eight feet, strict limitations are placed on the use of the trailer on the highways during hours when it might present a traffic hazard to other vehicles. For example, when the overall tire dimension exceeds eight feet, the trailer may be used only during the hours of 9:00 a.m. and 4:00 p.m. within fifty miles of the large cities in the State of California and, even in other areas, the trailers may be pulled over the highways only during daylight hours.

It is, therefore, an object of this invention to provide a heavy duty truck trailer that qualifies for carrying heavy loads but which, when such loads are not being transported, is not subjected to travel restrictions imposed on larger vehicles.

It is a further object of this invention to provide a heavy duty truck trailer having wheel units which are slidably carried on the trailer for lateral movement between positions of maximum spread for heavy load capacity and minimum spread for maximum road use.

It is a still further object of this invention to provide a heavy duty trailer employing force transmitting means to spread and retract the wheel units and adjust the load carrying capacity.

Other objects and advantages of this invention will become apparent from the description following when read in conjunction with the accompanying drawings wherein:

FIG. 1 is a side elevation of a heavy duty truck trailer embodying features of this invention;

FIG. 2 is a top view of the trailer of FIG. 1;

FIG. 3 is an enlarged side view of the wheel mounting unit of my invention;

FIG. 4 is an enlarged partial top view of the wheel mounting; and

FIG. 5 is a view of the wheel locking mechanism viewed along line 5—5 of FIG. 4.

Referring now to FIGS. 1 and 2, the heavy duty trailer 10 comprises a load carrying bed 12 supported on rigid frame members 14 which, at the forward ends are formed in a conventional goose neck 16 which, in turn, carries coupling means 18 for attaching the trailer to a tractor or, as shown, a forward-supporting dolly 20.

The dolly 20 comprises complementary coupling means shown generally at 22 carried on a frame 24, and depending from the frame are wheel support arms 26 to which are pivotally connected the sub frame 28 carrying the dolly wheels 30.

At the rear of the tractor is the main wheel sub frame 32 comprising forward and rear transverse frame members 34 and 36 which may be of box beam construction. The transverse frame members are interconnected at approximately their mid-points by a rigid longitudinal beam 38, and slidably carried in the transverse frame members are movable longitudinal frame members 40 and 42. The movable beams 40 and 42 are constrained to move laterally in a direction normal to their axes so that the wheels 44 will remain parallel. A suitable guide mechanism for this purpose comprises a sleeve member 46 which is secured to each of the movable beams 40 and 42 and slidably receives a guide rod 48 which extends laterally from the fixed longitudinal beam 38. Obviously, there are two guide rods, one extending from each side of the central rigid beam to be received in its accommodating sleeve. It is equally obvious that the parts may be reversed with the sleeves 46 being carried on the central fixed beam.

Referring now to FIGS. 3 to 5, each of the movable beams carries an assembly of wheels 44 as by means of a rigid transverse depending hanger 50 carrying a shaft 52. A journal bearing bracket 54 secured on the axle supporting rocker beam 56 rotatably receives the shaft 52 in order to permit a certain amount of rocking movement, enabling the wheels 44 to yield to irregularities in the road surface.

As shown most clearly in FIGS. 4 and 5, the ends of the movable beams 40 and 42 extend through slots 58 provided in the inner, opposing walls 34a and 36a of the transverse box beams 34 and 36 and are of a vertical thickness sufficient to be accommodated snugly within the transverse box beams for guiding purposes. A bolt 60 is threadedly received in each end of the movable beam 40 and, when loosened, is slidable within an accommodating slot 62 in the outer walls 34b and 36b of the transverse beams, thereby permitting the desired range of lateral movement. After the desired lateral movement is effected, the bolt and nut 60 may be tightened to lock the movable beams firmly in place.

The lateral movement above described may be effected by any number of force applying means, but preferably I utilize hydraulic rams 64, with two being secured at 66 and 68 between each movable beam and the center rigid beam, respectively. Then, fluid is introduced at either end, depending on the direction of movement desired through suitable connector hoses 70 and the hydraulic rams driven to separate or retract the wheels.

With the apparatus just described, the trailer may be utilized in a manner now to be described. An empty trailer is delivered to a warehouse or storage yard to receive a heavy load, such as earth moving equipment, and the trailer wheel sub frame 32 is jacked up by any conventional means (not shown) to lift the wheels free of the ground. Then, after the bolts 60 are loosened, the hydraulic jacks 64 are actuated so as to extend them and, hence, move the slidable beams 40 and 42 outward, carrying the outer wheels 44 to the position in which the lower set of wheels carried by the beam 40 are shown in FIG. 2. Then, after the nut 60 is retightened, locking the wheels in place for use, the jack is released and the trailer is supported on its wheels for loading the heavy earth moving equipment. By spreading the wheels, the trailer is qualified for carrying heavy loads by reason of the fact that greater stability is effected with the longer span and the highway is not subjected to as great a unit stress imposed by the outer wheels rounding a curve.

Then, after the destination is reached and the trailer is unloaded, the wheel assembly may again be jacked up off the ground; the bolts 60 are loosened; and the hydraulic rams are actuated to pull the movable beams 40 and 42 and, hence, the wheels back into the position shown in solid lines in FIG. 4. Since the need for stability is no longer as great, the narrower configuration of the wheels permits the trailer to operate under regulations provided for narrower vehicles and hence it can operate over a greater period of the day.

Having described my invention, I claim:

1. A heavy duty truck trailer comprising:
   a load-carrying platform and a wheel unit at one end of said platform including:
      a frame member comprising front and rear transverse beams and a longitudinal fixed beam secured to said transverse beams at approximately the midpoints thereof,
      a pair of laterally spaced wheel support members mounted on said frame member for lateral movement thereon, each said wheel support member comprising a longitudinal slidable beam slidably received at opposite ends on said transverse beams, said slidable beams being generally parallel to and on opposite sides of said fixed beam,
      at least one ground-engaging wheel carried on each of said wheel supports, and
      a selectively operated force applying means connected between said fixed beam and each of said slidable beams for moving said wheel support members laterally.

2. The heavy duty truck trailer defined by claim 1 including:
   complementary guide means connected between said fixed beam and each of said slidable beams constraining said slidable beam to movement normal to the longitudinal axis thereof.

3. The heavy duty truck trailer defined by claim 2 wherein:
   said guide means comprises a laterally extending sleeve secured to one of said beams, and
   a complementary rod secured to the other of said beams snugly received and slidable in said sleeve.

4. The heavy duty truck trailer defined by claim 1 including:
   a rocker bearing bracket depending from each of said slidable beams,
   a rocker beam pivotally connected intermediate its ends to said bracket, and
   at least two ground-engaging wheels rotatably mounted adjacent each end of said rocker beam.

5. A heavy duty truck trailer comprising:
   a load-carrying platform and a wheel unit at one end of said platform including:
      a frame member comprising front and rear transverse box beams formed with rectangular openings in opposing faces and adjacent the ends thereof, and at least one longitudinal fixed beam,
      a pair of laterally spaced wheel support members mounted on said frame member for lateral movement thereon, each said wheel support member comprising a longitudinal slidable beam slidably received at opposite ends in said rectangular openings,
      at least one ground engaging wheel carried on each of said wheel supports, and
      a selectively operated force applying means on said frame member connected to each of said wheel support members for moving said members laterally.

6. The heavy duty truck trailer defined by claim 5 including:
   means forming slots in the outer faces of said box beam adjacent the ends thereof,
   projections on opposite ends of said longitudinal beams extending through said slots, and
   locking means on said projections for securing them in fixed position along said slots.

References Cited

UNITED STATES PATENTS

| 2,318,802 | 5/1943 | Reid. | |
| 2,480,309 | 8/1949 | Tapp | 280—87 |
| 2,535,762 | 12/1950 | Tapp | 180—75 |
| 2,681,231 | 6/1954 | Kondracki | 180—9.48 |
| 2,743,936 | 5/1956 | Bigge. | |

LEO FRIAGLIA, Primary Examiner

U.S. Cl. X.R.
280—104.5, 423